United States Patent Office 2,699,448
Patented Jan. 11, 1955

2,699,448

ISOBUTOXY-BENZALDEHYDE THIOSEMI-CARBAZONE

Jack Bernstein, New Brunswick, William A. Lott, Maplewood, and Frederick Y. Wiselogle, New Brunswick, N. J., assignors to Olin Mathieson Chemical Corporation, New York, N. Y., a corporation of Virginia No Drawing. Application January 15, 1952,
Serial No. 266,604

1 Claim. (Cl. 260—552)

This invention relates to a substituted-benzaldehyde thiosemicarbazone and a method for the preparation thereof.

A large number of substituted-benzaldehyde thiosemicarbazones have been prepared heretofore (cf. Hoggarth et al., Brit. J. Pharmacol., 4, 248, and Domagk et al., Naturwissenschaften, 33, 315, inter alia) and screened for antituberculous activity, but these compounds (notably p-acetamido - benzaldehyde thiosemicarbazone) have failed to survive extensive clinical trial due to high toxicity. As part of this screening program, several p-(lower alkyl)-oxy-benzaldehyde thiosemicarbazones have been prepared and tested orally in mice for antituberculous activity, toxicity, etc.; but the results of tests of these compounds were not sufficiently promising to indicate that the (lower alkyl)-oxy-benzaldehyde thiosemicarbazone series should be further investigated.

Despite this contraindication, applicants have further investigated this series, and provided a novel compound, p-isobutoxy-benzaldehyde thiosemicarbazone, which is unique in the series with respect to activity, and is a utilizable and valuable chemotherapeutic agent, especially an antituberculous agent. As illustrative of its uniqueness it has been found that the p-isobutoxy compound, besides being highly effective as an antituberculous agent, is of remarkably low toxicity in comparison with other members of the series. Thus, clinical data have shown that the isobutoxy compound can be administered and maintained at an effective blood level in quantitites up to a daily dose of 300 mg. per patient without signs of toxicity. To maintain a comparably effective blood level with p-acetamido-benzaldehyde thiosemicarbazone an 800 mg. dosage is required—but with that compound the maximum safe dose is 100 mg. due to its greater toxicity.

Following is a specific embodiment illustrative of the invention:

Example

(a) 69 g. isobutyl iodide and 25 g. potassium hydroxide are added to a solution of 49 g. p-hydroxy-benzaldehyde in 200 ml. isobutyl alcohol and the reaction mixture is refluxed for 6 hours. 300 ml. water is then added and the alcohol is distilled off. The residue is extracted with ether and, after the ether extract is dried by treating with magnesium sulfate, the ether is distilled off. The residue is then distilled under reduced pressure, the fraction boiling at 128–130° C. at 7 mm. being collected. The product, p-isobutoxy-benzaldehyde, is obtained in a yield of about 20 g.

(b) A solution of 20 g. of p-isobutoxy-benzaldehyde in 75 ml. hot ethanol is added to a solution of 12 g. thiosemicarbazide in 100 ml. hot water. The p-isobutoxy-benzaldehyde thiosemicarbazone precipitates immediately. After the reaction mixture has cooled, the crystalline product is separated by filtering; on recrystallization from 300 ml. of 50% ethanol, pure crystals melting at 147–148.5° C. are obtained in a yield of about 53%.

Like the compound p-acetamido-benzaldehyde thiosemicarbazone [also known as p-formyl-acetanilide thiosemicarbazone], the compound of this invention is active perorally, and may be administered in the same pharmaceutical forms, i. e. dispersed or solubilized in an aqueous medium (as an inhalation aerosol or spray), or in dosage-unit carriers of the solid type (e. g., tablets or capsules). Thus, it may be incorporated in gelatin capsules each containing of the order of 25–200 mg. of the product. Alternatively, tablets containing of the order of 25–200 mg. of the compound of this invention may be formed by preparing a granulation of the compound with such binders as acacia, lactose, and starch [i. e. moistening, adding one or more of these binders, drying, screening, and adding a lubricant, such as stearic acid powder], and compressing the granulation into tablets each containing the selected dosage.

The compound of this invention is also useful as an environmental antituberculous agent, e. g. in hospital and dairy sanitation. For this purpose, it is incorporated in the usual carriers, e. g. aerosols and detergent solutions.

The invention may be variously otherwise embodied within the scope of the appended claim.

We claim:
p-Isobutoxy-benzaldehyde thiosemicarbazone.

References Cited in the file of this patent

Behnish et al., "Angewandte Chemie," vol. 60, May 1948, p. 114.
Hoggarth et al., "Br. J. Pharmacol," vol. 4 (1949), pp. 248 and 249.
Donovick et al., J. Bacteriology, vol. 59 (1950), p. 670.
Bernstein, Yale, Losee, Halsing, Martins and Lott, "J. Am. Chem. Soc.," vol. 73, March 1951, pp. 906–8.